United States Patent
Achenbach et al.

[19]

[11] Patent Number: 5,927,726

[45] Date of Patent: Jul. 27, 1999

[54] SEALING ARRANGEMENT FOR INJECTION VALVES IN FUEL FEED LINES

[76] Inventors: Manfred Achenbach, Meierhofstr.9, D-74321 Bietigheim-Bissingen; Peter Krumeich, Am Kriegsbergturm 46, D. 70192 Stuttgart; Gerhard Streit, Gerhart-Hauptmann-Weg 6/1, D-74223 Flein, all of Germany

[21] Appl. No.: 08/727,457

[22] PCT Filed: Mar. 31, 1995

[86] PCT No.: PCT/EP95/01212

§ 371 Date: Jan. 30, 1997

§ 102(e) Date: Jan. 30, 1997

[87] PCT Pub. No.: WO95/29336

PCT Pub. Date: Nov. 2, 1995

[30] Foreign Application Priority Data

Apr. 21, 1994 [DE] Germany .................... 44 13 863

[51] Int. Cl.⁶ .................................................. F16J 15/02
[52] U.S. Cl. ............................................ 277/609; 277/630
[58] Field of Search ............................... 277/607, 609, 277/630, 643, 931; 123/468, 469, 470, 471

[56] References Cited

U.S. PATENT DOCUMENTS

| | | | |
|---|---|---|---|
| 279,087 | 6/1883 | Emery .................................. | 277/167.5 |
| 3,190,702 | 6/1965 | Flick ...................................... | 277/168 |
| 3,776,209 | 12/1973 | Wertheimer et al. . | |
| 3,802,466 | 4/1974 | Panella ................................. | 277/168 |
| 3,941,109 | 3/1976 | Schmid . | |
| 4,327,690 | 5/1982 | Sauer et al. . | |
| 4,516,555 | 5/1985 | Shioya et al. . | |
| 5,044,340 | 9/1991 | Robnett . | |
| 5,072,710 | 12/1991 | Washizu .............................. | 123/469 |
| 5,092,300 | 3/1992 | Imoehl et al. ....................... | 123/469 |
| 5,479,900 | 1/1996 | Bodenhausen et al. ............. | 123/470 |

FOREIGN PATENT DOCUMENTS

| | | | |
|---|---|---|---|
| 2208646 | 8/1973 | Germany .............................. | 123/470 |
| 22 33 919 C3 | 1/1974 | Germany . | |
| 2824476 | 12/1979 | Germany .............................. | 123/470 |
| 33 16 163 A1 | 11/1983 | Germany . | |
| 33 04 567 A1 | 8/1984 | Germany . | |
| 34 15 780 A1 | 10/1984 | Germany . | |
| 38 38 914 A1 | 5/1990 | Germany . | |
| 108459 | 7/1982 | Japan .................................... | 123/470 |
| 10973 | 5/1914 | United Kingdom ................. | 123/470 |
| WO 91/11610 | 8/1991 | WIPO . | |
| WO 95/15452 | 6/1995 | WIPO . | |

OTHER PUBLICATIONS

Streit, G. and Anchenbach, M., "Funktionalität von Elastomerdichtungen bei tiefen Temperaturen am Beispiel von O–Ringen", KGK Kautschuk Gummi Kunstsoffe 46, Jahgang, Nr. Oct. 1993, pp. 812–823.

*Primary Examiner*—Anthony Knight
*Assistant Examiner*—John L. Beres
*Attorney, Agent, or Firm*—Blank Rome Comisky & McCauley, LLP

[57] ABSTRACT

A sealing system for connecting a valve for fuel injection in combustion engines to a fuel rail. Prior art systems employ an O-ring as a sealing element seated in an external groove of the valve housing which ends with a groove limiting flange adjacent to a bore in the rail, whereby the O-ring has to seal radially inside (groove bottom) and outside (wall of the hollow to include the valve). The disadvantage of such known systems is that under low temperature operation conditions special material properties of the O-ring are required and that radial external leakage occurs when the material swelling decreases owing to operation stoppage. The present invention results in system leak-tightness even in temperatures below 40° C. and in the case of insufficient material swelling. The present invention is a sealing system in which the radial inner sealing surface of the sealing element is axially expanded and is overlapping to an additional ring surface at the rail producing a sealing contact with the surface and in which the thermal expansion coefficients of the sealing element and the contacted metallic parts behave in such a way relative to each other that the element during cooling down shrinks radially in an inward direction. This results in tightness even under very low operation temperatures even when the sealing element is of usual material without specific thermal properties.

15 Claims, 3 Drawing Sheets

SEALING ARRANGEMENT FOR INJECTION VALVES IN FUEL FEED LINES

FIELD OF THE INVENTION

This invention relates to a sealing system for connecting a valve for fuel injection to a fuel rail in combustion engines, especially to preclude O-ring leakage at low temperatures.

BACKGROUND OF THE INVENTION

In usual sealing systems of this kind having an O-ring 32 as a sealing element, the sealing element is seated in a radial outer groove 26 of the valve housing 22 whereby the end of the valve housing to be connected to the fuel rail 10 is formed by a groove limiting flange 23 which abuts a ring surface 18 at the bottom 16 of a circular cylindrical rail branch 12 incorporating the valve housing 22, and which borders the bore 11 of the rail 10 at the branch-off point (see FIG. 8).

The disadvantage of such a sealing system is that the sealing elements used in low-temperature conditions must have special material properties to suit this application, yet they fail at temperatures below minus 40° C. when the swelling of the O-ring caused by the fuel is no longer sufficient to avoid leakage of the sealing element radially outside; please refer to G. Streit and M. Achenbach: "Functionality of elastomer seals at low temperatures by the example of O-rings, part 2: Influence of fuels on the sealing performance at low temperatures", in "Kautschuk, Gummi, Kunststoffe KGK, Internationale Fachzeitschrift für polymere Werkstoffe" ("Caoutchouc, Rubber, Synthetic Material KGK, International Technical Journal for Polymeric Material"), 10/93 (October 1993, 46th year) p. 812 ff.

SUMMARY OF THE INVENTION

The invention has the objective to create a sealing system of the aforementioned kind which guarantees reliable sealing of the plug-in connection of the injection valve and the pertaining branch of the fuel rail even at temperatures below minus 40° Celsius and in case of insufficient or lack of swelling of the sealing element (O-ring) (for example during extended periods between operation).

The advantage of the invention is that sealing rings without special qualities may be used as sealing elements at low temperatures and that leak-tightness is still achieved even under low temperatures or due to temporary lack of fuel, the swelling can no longer compensate for the cold-caused shrinkage of the sealing element.

The invention is based on the recognition that a sealing element which is not fixed to the wall of the installation space will shrink radially inwards onto its support whereby the radial inside sealing effect is increased whereas the radial outside sealing effect decreases.

The form-closed contact of the sealing element according to the invention at the branch of the fuel rail causes the sealing element to be held on the rail branch before the injection valve is inserted and secured.

In one configuration according to the present invention, a clamp-like sealing element secures the coherence of injection valve and rail branch, with the participation of the flange adaptor which may be formed in one piece with the fuel rail.

WO 91/11610 (corresponding to U.S. Pat. No. 5,044,340) discloses both a typical sealing system located at the end 14 of the injection valve 10, the injection valve end being adjacent to the fuel rail 18; this is a configuration which does not fully comply with the known sealing systems described at the beginning, since no flange of the valve housing is in contact with the branch 16 of the fuel rail 18, but the piston-shaped valve end 14 "telescopically" engages with the branch 16; as well as a sealing system similar to the typical one, located at the end 12 of the valve 10 adjacent to a distributor 22, where subsequent to an outside collar 32 of the valve housing replacing the known flange for axial limitation of the circular groove 26 for installation of the sealing element 34, a continuation of the groove bottom as extreme end of the valve housing reaches without contact into a bore 20 of the distributor 22, whereas the basically L-shaped sealing element 34 which is axially longer than radially thick and which is located with its thick portion in the circular groove 26, actually abuts the ring-shaped circumference of the collar 32 but not the extreme housing end. In exchange, under the pressure of the fuel rail 18, the circular ring-shaped axial front face of the sealing element 34 is in close contact with a shoulder 38 formed by the distributor bore 20 and a counterbore 36 in the distributor 22, whereas the radial outer face 42 of the sealing element 34 abuts the wall of the counterbore 36 as long as no low temperatures are prevailing. However, in case of low temperatures, this contact is terminated and the sealing element 34 shrinks radially inside onto the valve end 12 whereby it cannot reach over the collar 32 nor fit closely and with sealing effect to the extreme housing end.

So, contrary to the sealing system according to the invention, at the housing end 12 near the distributor, no radial sealing like that at the housing end 14 near the line takes place, but axial sealing takes place which, in case of radial shrinkage of the sealing element 34, still might be tight, which however, due to the lack of a sealing length along the outer face 42 of the sealing element, the axial seal is exposed to an increased pressure gradient, provided that the fuel rail 18 is under pressure at all.

BRIEF DESCRIPTION OF THE DRAWINGS

In the following, the invention is explained in detail with the help of several exemplary drawings of configurations of the sealing system according to the invention.

DETAILED DESCRIPTION OF THE INVENTION

Referring now in detail to the drawings, corresponding elements (parts, surfaces, spaces) of different embodiments are marked by reference numbers which are the same but incremented by multiples of 100.

Figure 1:
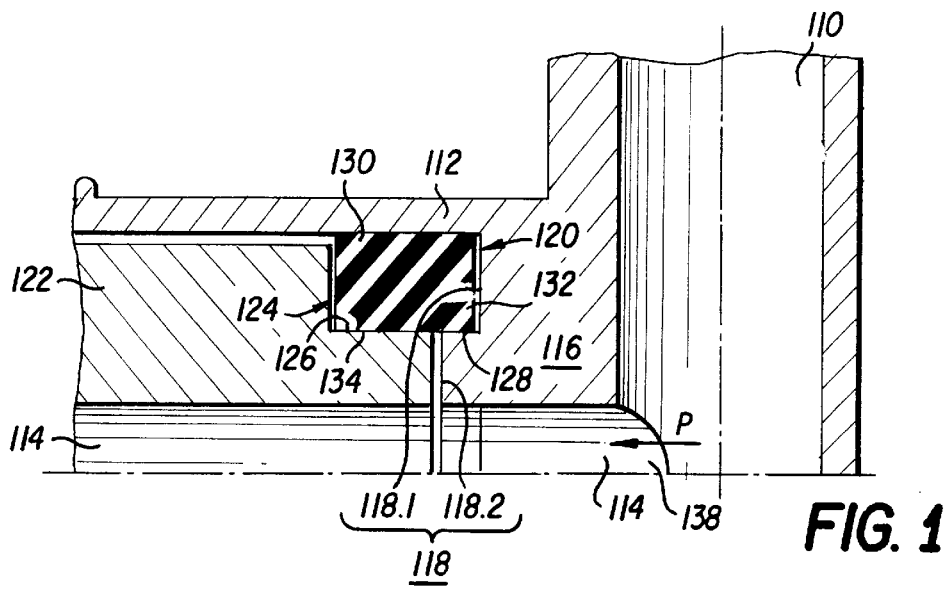
FIG. 1 shows a fragmented central longitudinal section of a first embodiment, showing a branch of fuel rail provided with an injection valve.

As shown in FIG. 1, a cylindrical branch 112 is formed vertically at a cylindrical fuel rail 110, particularly a distributor for several injection valves, the branch 112 having a central bore 114 connected to the hollow inside of the fuel rail 110, and a solid socket 116 formed at the wall of the fuel rail 110, the solid socket bordering bore 114 by a radially inward rectangularly upward stepped ring-shaped bottom surface 118 whose radial external part 118.1 limits an installation space 120 axial to the bore towards the fuel rail 110, and whose radial internal part 118.2 is opposite to the radial front face of the valve housing 122 of an injection valve. The end of the valve housing 122 near the rail shown in FIG. 1 is formed cylindrically and sticks in the branch 112 whereby it limits the installation space 120 axially towards the injection valve by means of a ring-shaped radial external rectangularly profiled corner recess 124, and radially inwards by a radial external ring surface 126 which is continued axially behind the gap between the socket 116 and the valve housing 122 by an additional radial external ring surface 128 of the same diameter, the ring surface 128 connecting the bottom surface parts 118.1 and 118.2

The installation space 120 which is limited radially outwardly by the wall of branch 112 and the cylindrical ring surface 130 coaxial to the ring surfaces 126 and 128, contains a rectangularly profiled elastomeric sealing element 132 which, contrary to the metallic fuel rail 110 and branch 112 and the metallic valve housing 122, is made up, for example, of fuel resistant rubber.

The degree to which the installation space is filled was chosen in a way to provide close fitting of the sealing element 132 with radial prestress under mounting temperature to the ring surfaces 126 and 128 and to the inner surface 130. When the operation temperature falls below the mounting temperature and the swelling of the sealing element under fuel influence can no longer maintain the radial external prestress of the element decreased by shrinkage, then the sealing element 132 detaches from the ring surface 130, but at the same time the sealing element 132 shrinks onto the ring surface 128 and the ring surface 126 which causes the gap between socket 116 and valve housing 122 to be sealed completely tight in both axial directions, since the sealing element 132 has an axially expanded radial inner sealing surface 134 which reaches over the additional radial external ring surface 128 of the socket and is seated tightly on the ring surface 128 which is part of the radial inner installation space.

Figure 2:
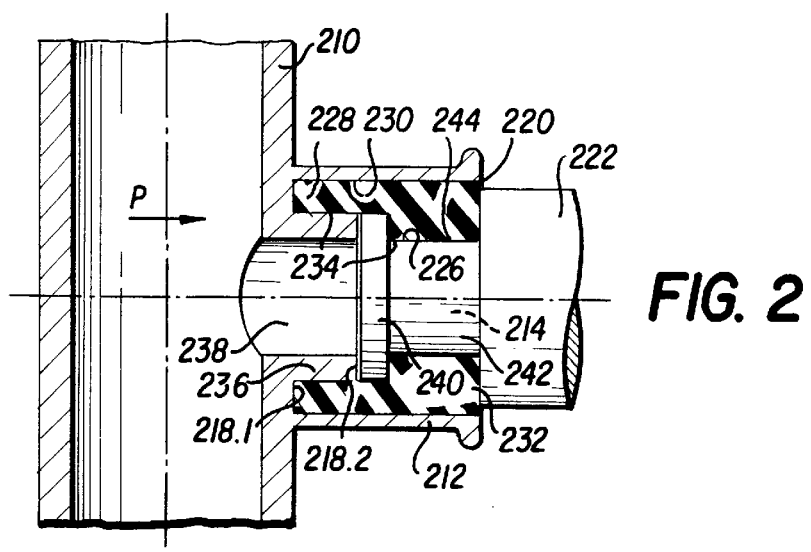
FIGS. 2 and 3 each show sectional views, respectively, of a second and a third embodiment corresponding to unfragmented FIG. 1.
Figure 8:
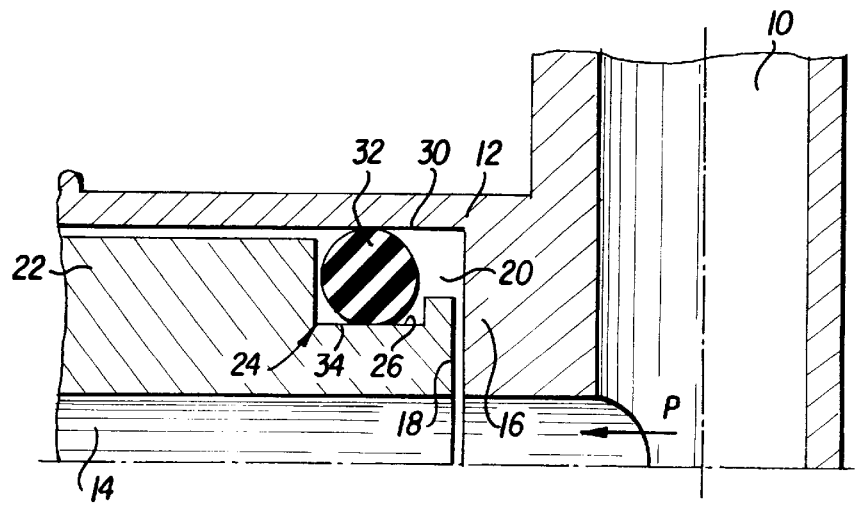
FIG. 8 shows a prior art device.

As shown in FIG. 2, a cylindrical fuel rail 210 has a cylindrical branch 212 containing a cylindrical coaxial interior socket 236 formed at the edge of the radial bore 238 of the fuel rail 210 at the branch-off point. At the free face of the interior socket 236 which in the branch 212 is in an axially deeper position, a flush disk-shape flange 240 is provided which, together with a valve housing 222 reaching forward to the branch 212 and a connecting circular pivot 242, forms a rectangularly profiled ring groove 244 into which a collar-like L-shaped sealing element 232 is reached which fills the complete installation space 220 axially between the fuel rail 210 on the one hand and the valve housing 222 on the other hand as well as radially between the branch 212 on the one hand and the bottom of the ring groove 244, the circumferential surface of the flange 240, and the external surface 228 of the interior socket 236 on the other hand, whereby the diameter of the pivot 242 is smaller than the outside diameter of the interior socket 236 and the equally dimensioned diameter of the flange 240. The diameters of the pivot 242 and the bore 238 are of equal size in this example of this embodiment. Such equal size is merely coincidental and not required. The radial external surface 228 of the interior socket 236 here forms the additional ring surface for the grasp of the sealing element 232.

Figure 3:
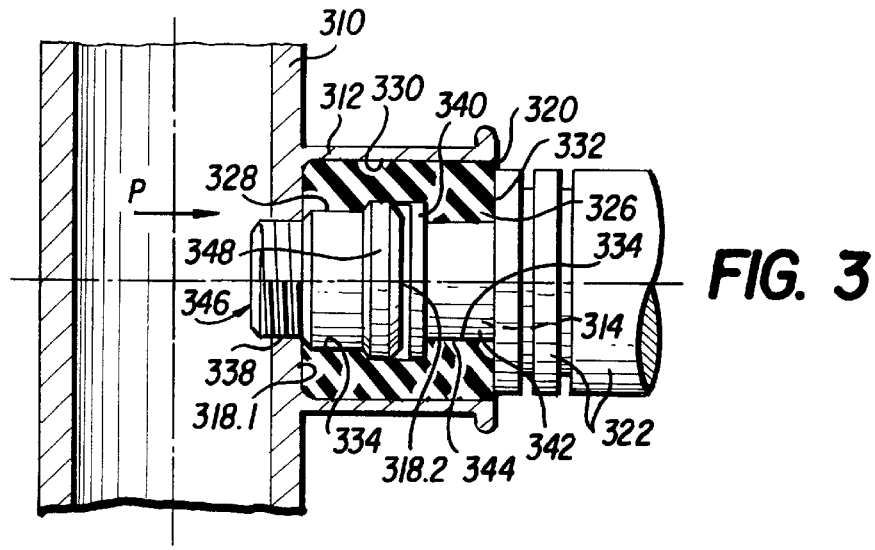

As shown in FIG. 3, the fuel rail 310 with its branch 312 has no interior socket 336. Rather, a coaxial adaptor 346 is inserted in a radial bore 338 of the fuel rail 310 along the cylinder axis of the branch 312, the adaptor 346 having an axial bore for connecting the fuel rail with an injection valve, and inside the branch 312 at its free end a trapezoidally profiled ring-shaped flange 348 as well as axially beside it a radial outer cylindrical ring surface 328. Next to the flange 348 there is a disk-shaped flange 340 linked to a valve housing 322 of the injection valve by means of a cylindrical pivot 342 whose cylindrical exterior surface 326 forms the bottom of a rectangularly profiled ring groove 344.

The installation space between the branch 321 radially outside and the adaptor 346 as well as the pivot 342 radially inside and axially between the wall of the fuel rail 310 on the one hand and the valve housing 322 on the other hand is filled by a sealing element 332 which is provided radially inside in the middle with a ring groove 350 for the two flanges 340 and 348; the flanks of the ring groove clamp the two flanges together. Thus, the radial inside sealing surface 334 is stepped and is in close sealing contact to both the ring surface 326 of the pivot 342 as well as the additional ring surface 328 of the adaptor 346. The diameter of the pivot 342 is somewhat smaller than the diameter of the adaptor ring surface 328, whereas the diameters of the two flanges 340 and 348 are of equal size.

Figure 4:
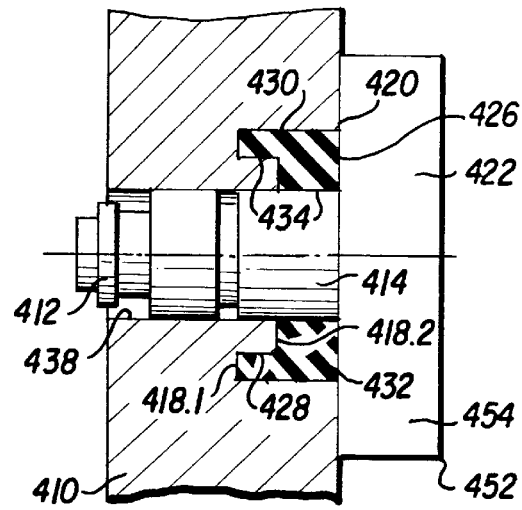
FIG. 4 shows a fragmented longitudinal section of a fourth embodiment at the branch of a fuel rail, the wall of which includes the injection valve at a branch-off point.

As shown in FIG. 4, the cylindrical wall of a fuel rail 410 is provided with a branch 412 which consists merely of a radial bore 414 in the line wall. Into the bore 414 an injection valve 452 is inserted provided with a flange 454 which abuts the fuel rail 410 with which it limits an L-profiled ring-shaped installation space 420 filled by an equally profiled sealing element 432 provided with a rectangularly stepped radial inner sealing surface 434, whereby the cylindrical part of the sealing surface 434 with increased diameter is seated on an additional cylindrical ring surface 428 which also limits the installation space 420 radially inside.

Figure 5:
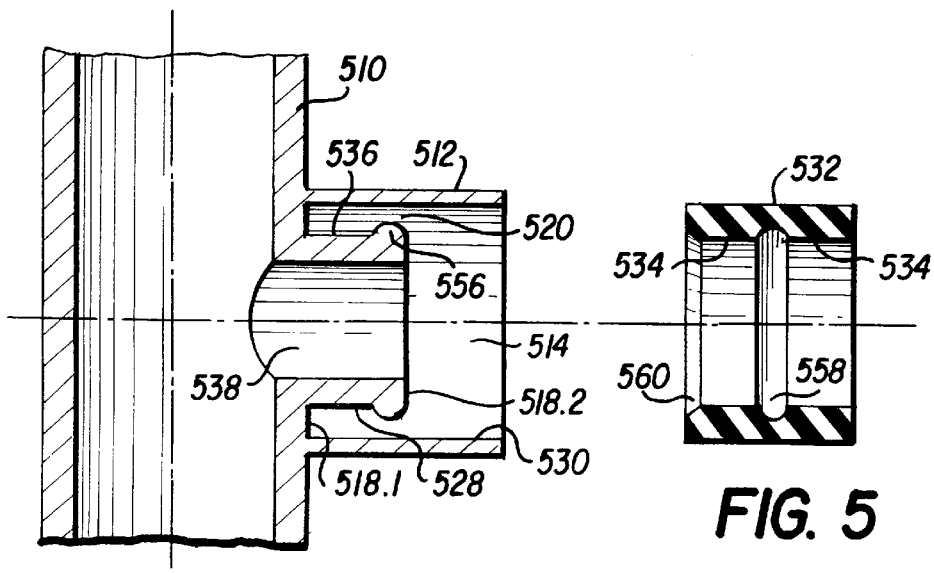
FIG. 5 shows a sectional view similar to FIGS. 2 and 3 of a fifth embodiment represented as an exploded view at the branch of a fuel rail to an injection valve (not shown)

As shown in FIG. 5, the embodiment of FIG. 2 can be modified in such a way to form at the free end of the interior socket 536 an outside bead 556 which as a radial elevation fits into an interior ring groove 558 as a radial depression of a sealing element 532, whereby the sealing element 532 for the rest is formed cylindrically but provided at the inner side of its end directed to the fuel rail 510 with a tapered chamfer 560 facilitating the installation of the sealing element 532 on the interior socket 536 over the outside bead 556 onto which the wall of the ring groove 558 snaps.

Figure 6:
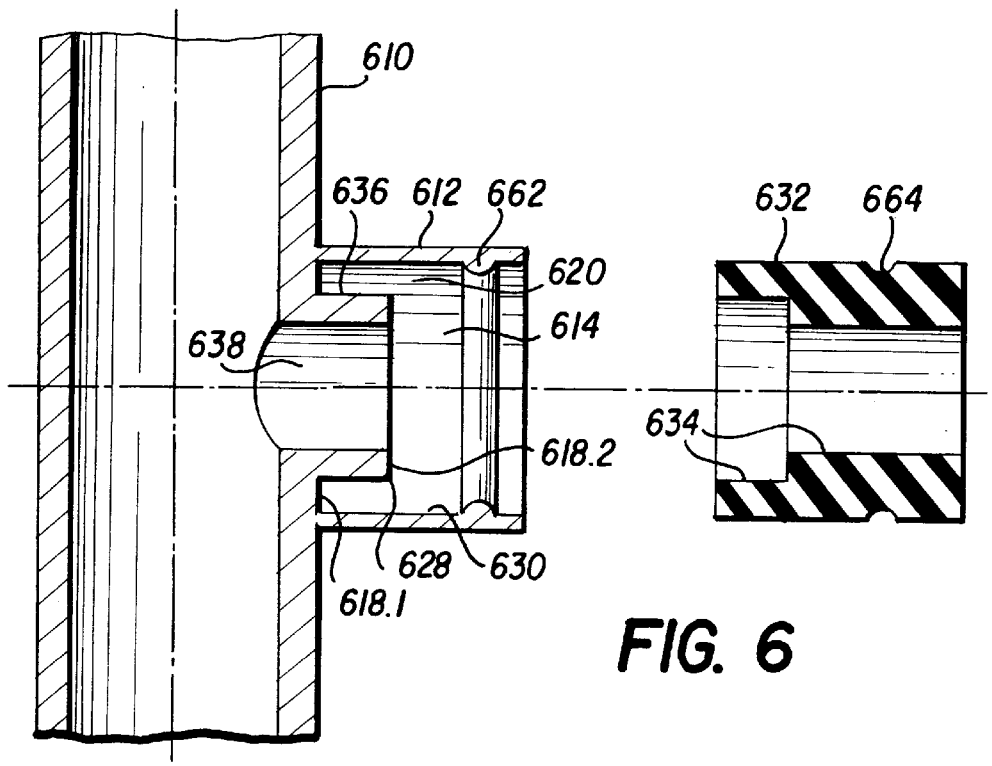
FIGS. 6 and 7 show sectional views similar to FIG. 5, respectively, of sixth and seventh embodiments represented as exploded views.

As shown in FIG. 6, it is possible to modify the embodiment of FIG. 2 as an option or in addition to the modification of FIG. 5 in such a way that on the one hand the straight profile of the radial inner ring surface 630 of the branch 612 of the fuel rail 610 is provided with a circular arc elevation 662 and on the other hand the sealing element 632 is provided with a corresponding depression 664 all around. The elevation 662 snaps into the depression when the sealing element 632 is put into the branch 612 and subsequently pushed onto the interior socket 636 until it stops at the fuel rail 610.

Figure 7:
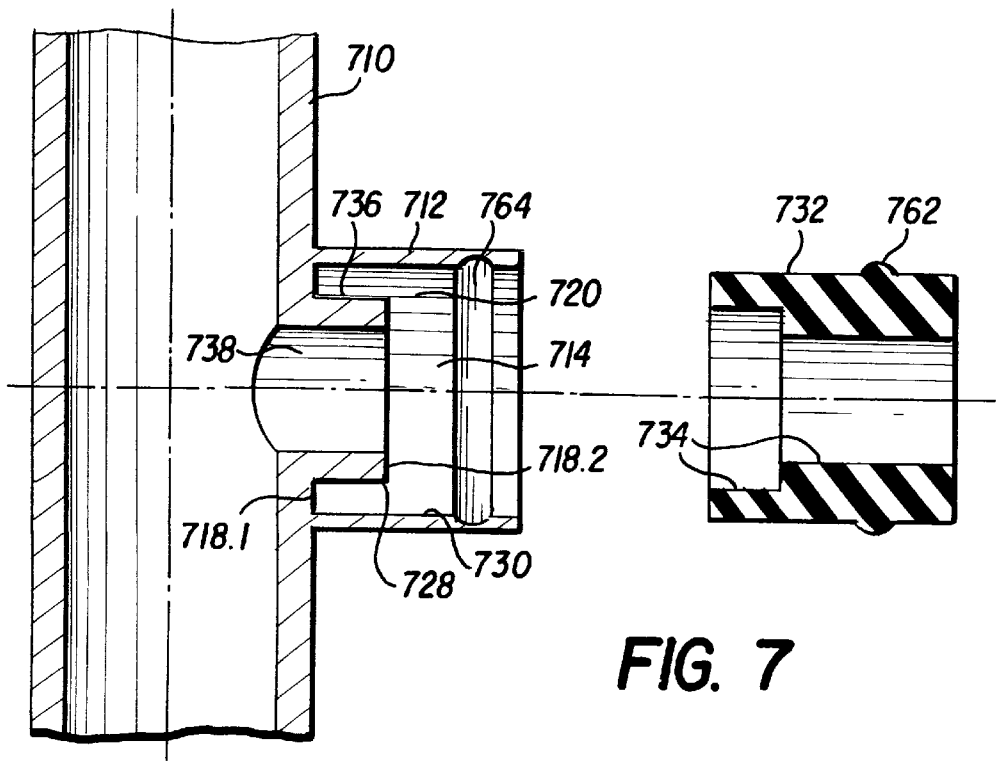

As shown in FIG. 7 the embodiment of FIG. 6 can be modified in such a way that the elevation 762 and the depression 764 change places and are now located on the sealing element respectively on the branch 712.

We claim:

1. Sealing system for connecting at least one fuel injection valve in a combustion engine to a fuel rail serving as a distributor for several injection valves; having a ring-shaped elastomer sealing element which is located in an axially limited installation space formed together by the valve and a first selected structure chosen from a group of structures consisting of a branch of the rail and the rail itself, whereby said ring-shaped sealing element fits to a radial outer ring surface of an axially pierced valve housing as well as fits under radial prestress to a coaxial, radial inner ring surface of said first selected structure, wherein the sealing element has an axially extending radial inner sealing surface which reaches over an additional radial outer ring surface of a second selected structure selected from a group of structures consisting of the branch, the rail, and a part connected to the rail, said axially extending radial inner sealing surface fitting with sealing effect to said radial outer ring surface of said second selected structure which additionally limits radially inside said installation space; and in that a radial thermal expansion coefficient of a material of the sealing element and radial thermal expansion coefficients of materials of the valve housing and of said second selected structure behave in such a way that the sealing element when it cools down shrinks onto said radial outer ring surface of the valve housing as well as onto said radial outer ring surface of said second selected structure.

2. Sealing system as set forth in claim 1, in which a profile of the ring-shaped installation space and a profile of the sealing element are essentially L-shape.

3. Sealing system as set forth in claim 2, in which the installation space at a branch-off point is completely contained in a wall of the rail.

4. Sealing system as set forth in claim 1, in which a cylindrical end of the branch which includes the valve housing has a coaxial interior socket the radial external surface of which forms an additional ring surface.

5. Sealing system as set forth in claim 4, in which the interior socket at a free end has a radial external bead for a form-closed grip into a radial inner ring groove of the sealing element.

6. Sealing system for connecting at least one fuel injection valve in a combustion engine to a fuel rail serving as a distributor for several injection valves; having a ring-shaped elastomer sealing element which is located in an axially limited installation space formed together by the valve and a first selected structure chosen from a group of structures consisting of a branch of the rail and the rail itself, whereby said ring-shaped sealing element fits to a radial outer ring surface of an axially pierced valve housing as well as fits under radial prestress to a coaxial, radial inner ring surface of said first selected structure, wherein the sealing element has an axially extending radial inner sealing surface which reaches over an additional radial outer ring surface of a second selected structure selected from a group of structures consisting of the branch, the rail, and a part connected to the rail, said axially extending radial inner sealing surface fitting with sealing effect to said radial outer ring surface of said second selected structure which additionally limits radially inside said installation space; and in that a radial thermal expansion coefficient of a material the sealing element and radial thermal expansion coefficients of materials of the valve housing and of said second selected structure behave in such a way that the sealing element when it cools down shrinks onto said radial outer ring surface of the valve housing as well as onto said radial outer ring surface of said second selected structure, and further wherein a profile of the ring-shaped installation space and a profile of the sealing element are essentially rectangular.

7. Sealing system as set forth in claim 6, in which a profile of the sealing element radially inside is provided with a depression for a form-closed grip of the wall of the branch.

8. Sealing system as set forth in claim 6, in which a profile of the sealing element radially outside is provided with a depression for a form-closed grip of the wall of the branch.

9. Sealing system as set forth in claim 6, in which a profile of the sealing element radially inside is provided with an elevation for a form-closed grip into the wall of the branch.

10. Sealing system as set forth in claim 6, in which a profile of the sealing element radially outside is provided with an elevation for a form-closed grip into the wall of the branch.

11. Sealing system as set forth in claim 6, in which a profile of the sealing element radially inside is provided with a depression for a form-closed grip into the wall of the rail.

12. Sealing system as set forth in claim 6, in which a profile of the sealing element radially outside is provided with a depression for a form-closed grip of the wall of the rail.

13. Sealing system as set forth in claim 6, in which a profile of the sealing element radially inside is provided with an elevation for a form-closed grip into the wall of the rail.

14. Sealing system as set forth in claim 6, in which a profile of the sealing element radially outside is provided with an elevation for a form-closed grip into the wall of the rail.

15. Sealing system for connecting at least one fuel injection valve in a combustion engine to a fuel rail serving as a distributor for several injection valves; having a ring-shaped elastomer sealing element which is located in an axially limited installation space formed together by the valve and a first selected structure chosen from a group of structures consisting of a branch of the rail and the rail itself, whereby said ring-shaped sealing element fits to a radial outer ring surface of an axially pierced valve housing as well as fits under radial prestress to a coaxial, radial inner ring surface of said first selected structure, wherein the sealing element has an axially extending radial inner sealing surface which reaches over an additional radial outer ring surface of a second selected structure selected from a group of structures consisting of the branch, the rail, and a part connected to the rail, said axially extending radial inner sealing surface fitting with sealing effect to said radial outer ring surface of said second selected structure which additionally limits radially inside said installation space; and in that a radial thermal expansion coefficient of a material of the sealing element and radial thermal expansion coefficients of materials of the valve housing and of said second selected structure behave in such a way that the sealing element when it cools down shrinks onto said radial outer ring surface of the valve housing as well as onto said radial outer ring surface of said second selected structure; and which at a housing end to be connected to one of said fuel rail and its branch is provided with a radial external ring groove with opposite surface for the seat of the sealing element, wherein a profile of the sealing element is a rectangle with a radial interior axially centric ring groove including two axially opposed flanges for axial limitation of the ring groove of a valve housing, and that said sealing element reaches over a free end of an axially pierced adaptor which communicates with a wall of the rail and forms an additional ring surface in touch with the sealing element.

* * * * *